(12) United States Patent
Ikeda et al.

(10) Patent No.: US 11,338,821 B2
(45) Date of Patent: May 24, 2022

(54) DISPLAY SYSTEM, DISPLAY METHOD, AND STORAGE MEDIUM

(71) Applicant: HONDA MOTOR CO., LTD., Tokyo (JP)

(72) Inventors: Masaya Ikeda, Wako (JP); Kenji Sugiyama, Wako (JP); Yoshitaka Mimura, Wako (JP); Takashi Watanabe, Wako (JP); Taichi Sogo, Wako (JP); Masayuki Takahashi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 243 days.

(21) Appl. No.: 16/571,238

(22) Filed: Sep. 16, 2019

(65) Prior Publication Data

US 2020/0086890 A1 Mar. 19, 2020

(30) Foreign Application Priority Data

Sep. 19, 2018 (JP) .............................. JP2018-175010

(51) Int. Cl.
  *B60W 50/14* (2020.01)
  *B60W 30/18* (2012.01)
  *G09G 5/37* (2006.01)

(52) U.S. Cl.
  CPC ...... *B60W 50/14* (2013.01); *B60W 30/18163* (2013.01); *G09G 5/37* (2013.01);
  (Continued)

(58) Field of Classification Search
  CPC .................................................. B60W 50/14
  See application file for complete search history.

(56) References Cited

U.S. PATENT DOCUMENTS 7,222,306 B2 * 5/2007 Kaasila .................... G09G 5/24
  715/801
8,346,426 B1 * 1/2013 Szybalski .......... G01C 21/3676
  701/28
(Continued)

FOREIGN PATENT DOCUMENTS

JP 2008-139148 6/2008
JP 2010-198578 9/2010
(Continued)

OTHER PUBLICATIONS

Japanese Office Action for Japanese Patent Application No. 2018-175010 dated Nov. 2, 2021.

*Primary Examiner* — Redhwan K Mawari
(74) *Attorney, Agent, or Firm* — Amin, Turocy & Watson, LLP

(57) ABSTRACT

A display system includes a display that displays a first image simulating a road on which a host vehicle is traveling, and a display controller that causes the display to display a second image simulating a recommended lane given to a controller that performs driving control of the host vehicle at a position associated with the first image, and to display a third image simulating a target trajectory generated by the controller that performs driving control of the host vehicle at a position associated with the first image, wherein the display controller changes the third image to an image simulating the target trajectory for lane change without changing a display position of the second image when the controller executes driving control for causing the host vehicle to return to an original lane after causing the host vehicle to perform lane change.

5 Claims, 9 Drawing Sheets

(52) U.S. Cl.
CPC . *B60W 2050/146* (2013.01); *B60W 2540/215* (2020.02); *G09G 2380/10* (2013.01)

(56) References Cited

U.S. PATENT DOCUMENTS

| | | | | |
|---|---|---|---|---|
| 8,676,431 | B1* | 3/2014 | Mariet | G08G 1/166 |
| | | | | 701/28 |
| 8,887,050 | B1* | 11/2014 | Siracusano, Jr. | G11B 27/34 |
| | | | | 715/723 |
| 9,552,334 | B1* | 1/2017 | Meisels | G06Q 50/01 |
| 2005/0165279 | A1* | 7/2005 | Adler | A61B 1/00009 |
| | | | | 600/181 |
| 2008/0172704 | A1* | 7/2008 | Montazemi | G11B 27/034 |
| | | | | 725/105 |
| 2010/0215213 | A1* | 8/2010 | Mielekamp | A61B 17/3403 |
| | | | | 382/103 |
| 2015/0029214 | A1* | 1/2015 | Kumagai | G06T 19/006 |
| | | | | 345/625 |
| 2015/0297949 | A1* | 10/2015 | Aman | G06T 7/246 |
| | | | | 348/157 |
| 2016/0210747 | A1* | 7/2016 | Hay | A61B 5/7435 |
| 2017/0024121 | A1* | 1/2017 | Park | G06F 3/04812 |
| 2017/0085867 | A1* | 3/2017 | Baran | H04N 13/302 |
| 2018/0088800 | A1* | 3/2018 | Provost | G06F 3/0482 |
| 2018/0178807 | A1* | 6/2018 | Murata | G01C 21/34 |
| 2018/0367742 | A1* | 12/2018 | Ando | H04N 5/232121 |
| 2019/0111933 | A1* | 4/2019 | Schoeggl | B60W 50/085 |
| 2020/0172110 | A1* | 6/2020 | Uemori | B60W 60/0023 |
| 2020/0231178 | A1* | 7/2020 | Murayama | B60W 60/0011 |
| 2021/0163026 | A1* | 6/2021 | Ochida | B60W 30/18163 |

FOREIGN PATENT DOCUMENTS

| | | | | |
|---|---|---|---|---|
| JP | 2015-011458 | | 1/2015 | |
| JP | 2016-182891 | | 10/2016 | |
| JP | 2016-199204 | | 12/2016 | |
| JP | 2017-030723 | | 2/2017 | |
| JP | 2017-068585 | | 4/2017 | |
| JP | 2017-210034 | | 11/2017 | |
| JP | 2020051902 A | * | 4/2020 | B60K 35/00 |
| WO | 2018/087883 | | 5/2018 | |

* cited by examiner

DISPLAY SYSTEM, DISPLAY METHOD, AND STORAGE MEDIUM

CROSS-REFERENCE TO RELATED APPLICATION

Priority is claimed on Japanese Patent Application No. 2018-175010, filed Sep. 19, 2018, the content of which is incorporated herein by reference.

BACKGROUND

Field of the Invention

The present invention relates to a display system, a display method, and a storage medium.

Description of Related Art

In recent years, research on automatically controlling the driving of a vehicle (hereinafter referred to as automated driving) has advanced. In relation thereto, a technology for displaying lanes near a host vehicle and icons indicating the host vehicle and other vehicles on a screen, and displaying a lane change direction and a traveling route of a vehicle at the time of lane change is known (for example, U.S. Pat. No. 8,346,426).

SUMMARY

However, in the related art, since detailed information on the lane change is not displayed, an occupant may feel insecure during driving control of the host vehicle.

An aspect of the present invention is made in consideration of such circumstances, and an object of the present invention is to provide a display system, a display method, and a storage medium capable of performing display control for giving a higher sense of security to an occupant.

A display system, a display method, and a storage medium according to the present invention adopt the following configurations.

(1) A display system according to an aspect of the present invention is a display system including: a display configured to display a first image simulating a road on which a host vehicle is traveling; and a display controller configured to cause the display to display a second image simulating a recommended lane given to a controller that performs driving control of the host vehicle at a position associated with the first image, and to display a third image simulating a target trajectory generated by the controller that performs driving control of the host vehicle at a position associated with the first image, wherein the display controller is configured to change the third image to an image simulating the target trajectory for lane change without changing a display position of the second image when the controller executes driving control for causing the host vehicle to return to an original lane after causing the host vehicle to perform lane change.

(2) In the aspect of (1), the second image includes an image in which substantially an entire area corresponding to the recommended lane is colored with a predetermined color.

(3) In the aspect of (2), the third image is an image of an area narrower than the area corresponding to the recommended lane.

(4) In the aspect of (1), the display controller is configured to change the third image to an image simulating the target trajectory for lane change without changing a display position of the second image when the controller executes driving control for causing the host vehicle to execute lane change for overtaking the preceding vehicle and to return to an original lane after overtaking the preceding vehicle.

(5) In the aspect of (1), the display controller is configured to change the display position of the second image to a position of a lane that is a lane change destination, and cause a fourth image noticing lane change to be displayed when the controller receives an instruction for lane change from an occupant of the host vehicle and executes the lane change of the host vehicle.

(6) A display method according to an aspect of the present invention is a display method including: displaying, by a computer mounted in a host vehicle including a display that displays an image, a first image simulating a road on which the host vehicle travels on the display; causing, by the computer, the display to display a second image simulating a recommended lane given to a controller that performs driving control of the host vehicle at a position associated with the first image, and to display a third image simulating a target trajectory generated by the controller that performs driving control of the host vehicle at a position associated with the first image; and changing, by the computer, the third image to an image simulating the target trajectory for lane change without changing a display position of the second image when the controller executes driving control for causing the host vehicle to return to an original lane after causing the host vehicle to perform lane change.

(7) A storage medium according to an aspect of the present invention is a computer-readable non-transitory storage medium storing a program, the program causing a computer mounted in a host vehicle including a display that displays an image to: cause the display to display a first image simulating a road on which the host vehicle travels; cause the display to display a second image simulating a recommended lane given to a controller that performs driving control of the host vehicle at a position associated with the first image, and to display a third image simulating a target trajectory generated by the controller that performs driving control of the host vehicle at a position associated with the first image; and change the third image to an image simulating the target trajectory for lane change without changing a display position of the second image when the controller executes driving control for causing the host vehicle to return to an original lane after causing the host vehicle to perform lane change.

According to the above (1) to (7), it is possible to perform display control for giving a higher sense of security to the occupant.

DESCRIPTION OF EMBODIMENTS

Hereinafter, embodiments of a display system, a display method, and a storage medium of the present invention will be described with reference to the drawings. In the embodiment, a display system that causes a recognition result of surroundings of a vehicle to be displayed on a display device mounted in the vehicle in the vehicle capable of executing driving control for assisting in a driving operation of an occupant will be described. The driving control is to control one or both of steering and speed of the vehicle. For the driving control, driving control such as an Adaptive Cruise Control System (ACC), Lane Keeping Assistance System (LKAS), Automated Lane Change (ALC), or Lane Change Assist (LCA) can be executed. The ACC is, for example, driving control for causing the host vehicle M to overtake a preceding vehicle and travel. The LKAS is, for example, driving control for keeping a lane in which the host vehicle M travels. The ALC is, for example, driving control for performing lane change on the basis of a route setting using a navigation device regardless of whether or not a lane change instruction is received from the occupant. The ALC includes, for example, lane change in automatic overtaking control and lane change at a branch. The LCA is driving control for performing lane change in an instructed direction on the basis of the lane change instruction from the occupant.

[Overall Configuration]

Figure 1:
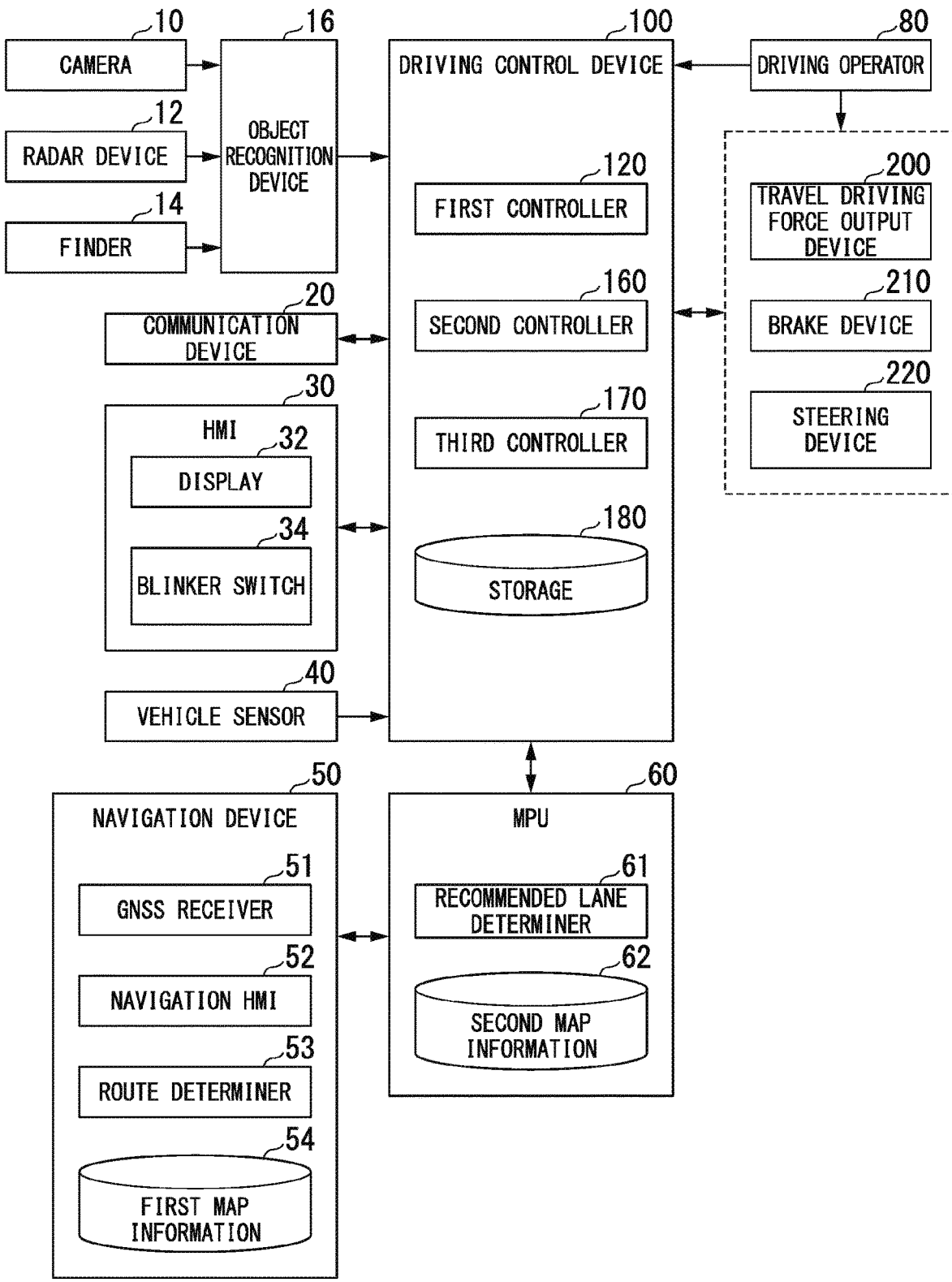
FIG. 1 is a configuration diagram of a vehicle system including a display system according to an embodiment.

FIG. 1 is a configuration diagram of a vehicle system 1 including a display system according to an embodiment. A vehicle in which the vehicle system 1 is mounted (hereinafter referred to as the host vehicle M) is, for example, a vehicle such as a two-wheeled vehicle, a three-wheeled vehicle, or a four-wheeled vehicle. A driving source thereof is an internal combustion engine such as a diesel engine or a gasoline engine, an electric motor, or a combination thereof. The electric motor operates using power generated by a power generator connected to the internal combustion engine or discharge power of a secondary battery or a fuel cell.

The vehicle system 1 includes, for example, a camera 10, a radar device 12, a finder 14, an object recognition device 16, a communication device 20, a human machine interface (HMI) 30, a vehicle sensor 40, a navigation device 50, a map positioning unit (MPU) 60, a driving operator 80, an driving control device 100, a travel driving force output device 200, a brake device 210, and a steering device 220. These devices or equipment are connected to each other by a multiplex communication line such as a controller area network (CAN) communication line, a serial communication line, a wireless communication network, or the like. The configuration shown in FIG. 1 is merely an example, and a part of the configuration may be omitted or another configuration may be added. A combination of an HMI 30, the navigation device 50, an MPU 60, and a third controller to be described below is an example of a "display system." A combination of a first controller and a second controller to be described below is an example of a "controller."

The camera 10 is, for example, a digital camera using a solid-state imaging device such as a charge coupled device (CCD) or a complementary metal oxide semiconductor (CMOS). The camera 10 is attached to any place on the host vehicle M. In the case of forward imaging, the camera 10 is attached to an upper portion of a front windshield, a rear surface of a rearview mirror, or the like. The camera 10, for example, periodically and repeatedly images surroundings of the host vehicle M. The camera 10 may be a stereo camera.

The radar device 12 radiates radio waves such as millimeter waves to the surroundings of the host vehicle M and detects radio waves (reflected waves) reflected by an object to detect at least a position (a distance and orientation) of the object. The radar device 12 is attached to any place on the host vehicle M. The radar device 12 may detect a position and a speed of the object using a frequency modulated continuous wave (FM-CW) scheme.

The finder 14 is a light detection and ranging (LIDAR). The finder 14 radiates light to the surroundings of the host vehicle M and measures scattered light. The finder 14 detects a distance to a target on the basis of a time from light emission to light reception. The radiated light is, for example, pulsed laser light. The finder 14 is attached to any place on the host vehicle M.

The object recognition device 16 performs a sensor fusion process on detection results of some or all of the camera 10, the radar device 12, and the finder 14 to recognize a position, type, speed, and the like of the object. The object recognition device 16 outputs recognition results to the driving control device 100. The object recognition device 16 may output the detection results of the camera 10, the radar device 12, or the finder 14 as they are to the driving control device 100. The object recognition device 16 may be omitted from the vehicle system 1.

The communication device 20, for example, communicates with another vehicle present near the host vehicle M using a cellular network, a Wi-Fi network, Bluetooth (registered trademark), dedicated short range communication (DSRC), or the like (inter-vehicle communication) or communicates with various server devices via a wireless base station.

The HMI 30 presents various types of information to an occupant of the host vehicle M and receives an input operation from the occupant. The HMI 30 includes, for example, a display 32, a switch, a speaker, a buzzer, a touch panel, and a key. The display 32 includes, for example, a first display 32A and a second display 32B. The switch includes a blinker switch (a turn indicator) 34.

Figure 2:
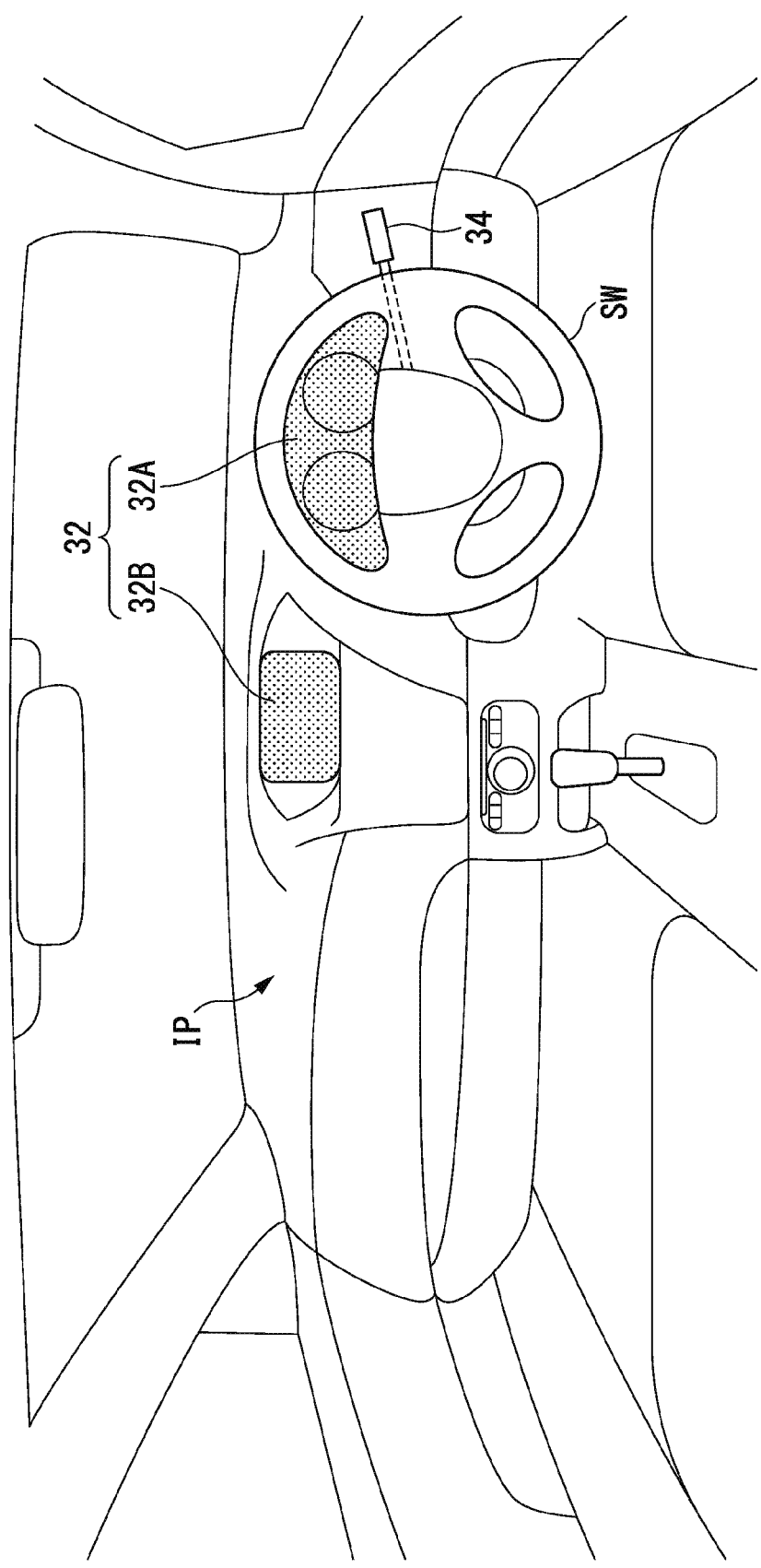
FIG. 2 is a diagram schematically showing an appearance of a vehicle cabin of a host vehicle.

FIG. 2 is a diagram schematically showing a state of the vehicle cabin of the host vehicle M. For example, the first display 32A is provided near the front of a driver's seat (for example, a seat closest to a steering wheel SW) in an instrument panel IP, and is installed at a position at which the occupant can visually recognize the first display 32A from a gap of the steering wheel SW or through the steering wheel SW. The first display 32A is, for example, a liquid crystal display (LCD) or an organic electro luminescence (EL) display device. Information necessary for traveling at the time of manual driving or driving control of the host vehicle M is displayed as an image on the first display 32A. The information necessary for traveling of the host vehicle M at the time of the manual driving is, for example, a speed, engine speed, a remaining amount of fuel, radiator water temperature, traveling distance, and other information of the host vehicle M. The information necessary for traveling of the host vehicle M at the time of driving control includes, for example, lanes (marking lines), a route to a destination recommended by a system such as the navigation device 50 (a recommended lane), a future trajectory of the host vehicle M (a target trajectory), and information on other vehicles. The information necessary for traveling of the host vehicle M at the time of driving control may include some or all of the information necessary for traveling of the host vehicle M at the time of manual driving.

The second display 32B is installed, for example, near a center of the instrument panel IP. The second display 32B is, for example, an LCD or an organic EL display device, similar to the first display 32A. The second display 32B displays, for example, an image corresponding to a navigation process that is executed by the navigation device 50. The second display 32B may display a television program, perform playback of a DVD, or display content such as a downloaded movie. The display 32 may include a head-up display (HUD) device in place of (or in addition to) the first display 32A and the second display 32B. The HUD device is a device that causes an image superimposed on a landscape to be visually recognized, and as an example, a device that causes a viewer to visually recognize a virtual image by projecting light including an image onto a front windshield or a combiner of the host vehicle M. The viewer is, for example, a driver, but may be an occupant other than the driver.

The blinker switch 34 is provided, for example, on a steering column or the steering wheel SW. The blinker switch 34 is a switch that is used for the occupant to instruct an operation of a blinker, and is an example of an operation unit that receives an instruction to perform lane change or right or left turn of the host vehicle M by the occupant. The blinker is disposed, for example, at predetermined right and left places from a front end portion to a rear end portion on the side of the host vehicle M. Blinking of one of the right and left blinkers corresponding to an instructed direction is started or ended by operating the blinker switch 34.

The vehicle sensor 40 includes, for example, a vehicle speed sensor that detects a speed of the host vehicle M, an acceleration sensor that detects acceleration, a yaw rate sensor that detects an angular speed around a vertical axis, and an orientation sensor that detects a direction of the host vehicle M.

The navigation device 50 includes, for example, a global navigation satellite system (GNSS) receiver 51, a navigation HMI 52, and a route determiner 53. The navigation device 50 holds first map information 54 in a storage device such as a hard disk drive (HDD) or a flash memory.

The GNSS receiver 51 specifies a position of the host vehicle M on the basis of a signal received from a GNSS satellite. The position of the host vehicle M may be specified or supplemented by an inertial navigation system (INS) using an output of the vehicle sensor 40.

The navigation HMI 52 includes a display device, a speaker, a touch panel, keys, and the like. The navigation HMI 52 may be partly or wholly shared with the above-described HMI 30.

The route determiner 53, for example, determines a route (hereinafter, an on-map route) from the position of the host vehicle M (or any input position) specified by the GNSS receiver 51 to a destination input by the occupant using the navigation HMI 52 by referring to the first map information 54. The first map information 54 is, for example, information in which a road shape is represented by links indicating roads and nodes connected by the links. The first map information 54 may include a curvature of the road, point of interest (POI) information, and the like. The on-map route is output to the MPU 60.

The navigation device 50 may perform route guidance using the navigation HMI 52 on the basis of the on-map route. The navigation device 50 may be realized, for example, by a function of a terminal device such as a smartphone or a tablet terminal possessed by the occupant. The navigation device 50 may transmit a current position and a destination to a navigation server via the communication device 20 and acquire the same route as the on-map route from the navigation server.

The MPU 60 includes, for example, a recommended lane determiner 61 and holds second map information 62 in a storage device such as an HDD or a flash memory. The recommended lane determiner 61 divides the on-map route provided from the navigation device 50 into a plurality of blocks (for example, divides the route every 100 [m] in a traveling direction of the vehicle) and determines a recommended lane for each block by referring to the second map information 62. The recommended lane determiner 61 determines in which lane from the left the host vehicle M travels. The recommended lane determiner 61 determines the recommended lane so that the host vehicle M can travel on a reasonable route for traveling to a branch destination when there is a branch place in the on-map route.

The second map information 62 is map information with higher accuracy than the first map information 54. The second map information 62 includes, for example, information on a center of the lane or information on a boundary of the lane, and information on a type of lane. The second map information 62 may include road information, traffic regulation information, address information (an address and postal code), facility information, telephone number information, and the like. The second map information 62 may be updated at any time by the communication device 20 communicating with another device.

The driving operator 80 includes, for example, an accelerator pedal, a brake pedal, a shift lever, the steering wheel SW, a modified steering wheel, a joystick, and other operators. A sensor that detects the amount of operation or the presence or absence of the operation is attached to the driving operator 80, and a result of the detection is output to some or all of the driving control device 100, the travel driving force output device 200, the brake device 210, and the steering device 220.

The driving control device 100 includes, for example, a first controller 120, a second controller 160, a third controller 170, and a storage 180. The first controller 120, the second controller 160, and the third controller 170 are realized, for example, by a computer processor such as a central processing unit (CPU) executing a program (software). Some or all of these components may be realized by hardware (including circuitry) such as a large scale integration (LSI), an application specific integrated circuit (ASIC), a field-programmable gate array (FPGA), or a graphics processing unit (GPU) or may be realized by software and hardware in cooperation. The program may be stored in a storage (an example of a storage device including a non-transitory storage medium) of the driving control device 100 in advance or may be stored in a removable storage medium (an example of the non-transitory storage medium) such as a DVD or a CD-ROM and the storage medium may be mounted in a drive device so that the program may be installed in the storage 180.

The storage 180 is realized by, for example, an HDD, a flash memory, an electrically erasable programmable read only memory (EEPROM), a read only memory (ROM), or a random access memory (RAM). The storage 180 stores, for example, a program read and executed by a processor.

Figure 3:
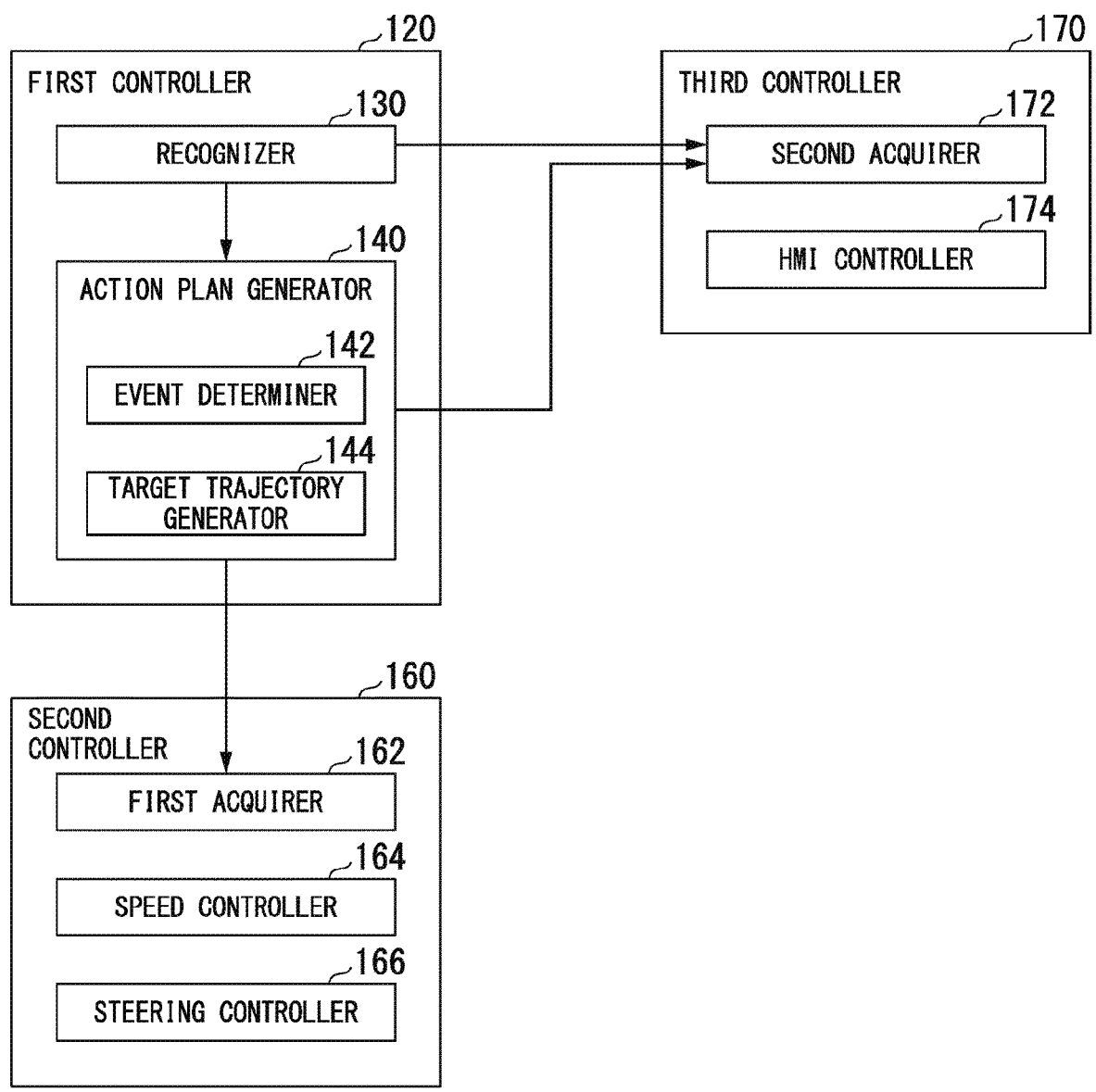
FIG. 3 is a functional configuration diagram of a first controller, a second controller, and a third controller.

FIG. 3 is a functional configuration diagram of the first controller 120, the second controller 160, and the third controller 170. The first controller 120 includes, for example, a recognizer 130 and an action plan generator 140. The first controller 120 realizes, for example, a function based on artificial intelligence (AI) and a function based on a previously given model in parallel. For example, a function of "recognizing an intersection" may be realized by executing recognition of the intersection using deep learning or the like and recognition based on previously given conditions (a signal which can be subjected to pattern matching, a road sign, or the like) in parallel, scoring both recognitions, and comprehensively evaluating the recognitions. Accordingly, the reliability of the driving control of the host vehicle M is ensured.

The recognizer 130 recognizes a situation of surroundings of the host vehicle M. For example, the recognizer 130 recognizes an object present around the host vehicle M on the basis of information input from the camera 10, the radar device 12, and the finder 14 via the object recognition device 16. The objects recognized by the recognizer 130 are, for example, other vehicles such as bicycles, motorcycles, and four-wheeled vehicles. The objects include pedestrians, road signs, road markings, marking lines, utility poles, guard rails, falling objects, and the like. The recognizer 130 recognizes a position of the objects, speed, acceleration, a steering angle, and a state of the host vehicle M such as a direction of the host vehicle M. The position of the object, for example, is recognized as a position at relative coordinates (that is, a relative position with respect to the host vehicle M) with a representative point (a centroid, a drive shaft center, or the like) of the host vehicle M as an origin and is used for control. The position of the object may be represented by a representative point such as a centroid or a corner of the object or may be represented by a represented area. When the object is a moving body such as another vehicle, the "state" of the object may include an acceleration or jerk of the object, or an "action state" (for example, whether the object is performing lane change or is about to perform lane change).

The recognizer 130 recognizes, for example, the shape of the road around the host vehicle M. For example, the recognizer 130 recognizes the host lane in which the host vehicle M is traveling or an adjacent lane adjacent to the host lane. For example, the recognizer 130 compares a pattern of a road marking line (for example, an arrangement of a solid line and a broken line) obtained from the second map information 62 with a pattern of a road marking line near the host vehicle M recognized from an image captured by the camera 10 to recognize the host lane or the adjacent lane.

The recognizer 130 may recognize not only the road marking lines but also a traveling road boundary (a road boundary) including the road marking line, a road shoulder, a curb, a median strip, a guard rail, or the like to recognize the host lane or the adjacent lane. In this recognition, the position of the host vehicle M acquired from the navigation device 50 or a processing result of an INS may be additionally considered. The recognizer 130 recognizes a temporary stop line, an obstacle, a red light, a toll gate, and other road events.

The recognizer 130 recognizes a relative position or posture of the host vehicle M with respect to the traveling lane when recognizing the host lane. The recognizer 130 may recognize, for example, a deviation of a reference point of the host vehicle M from a center of the lane and an angle formed between a traveling direction of the host vehicle M and a line connecting the center of the lane as a relative position and posture of the host vehicle M with respect to the host lane. Instead, the recognizer 130 may recognize, for example, a position of the reference point of the host vehicle M with respect to any one of side end portions (the road marking line or the road boundary) of the host lane as the relative position of the host vehicle M with respect to the host lane.

The action plan generator 140 includes, for example, an event determiner 142 and a target trajectory generator 144. The event determiner 142 determines a driving control event in a route in which the recommended lane is determined. The event is information defining a traveling aspect of the host vehicle M.

Examples of the event include a constant-speed traveling event in which the host vehicle M is caused to travel in the same lane at a constant speed, a following traveling event in which another vehicle (hereinafter referred to as a preceding vehicle, if necessary) present within a predetermined distance in front of the host vehicle M (for example, within 100 m) and closest to the host vehicle M is caused to overtake the host vehicle M, a lane change event in which the host vehicle M is caused to perform lane change from the host lane to an adjacent lane, an overtaking event in which the host vehicle M is first caused to perform lane change to an adjacent lane, overtake a preceding vehicle in the adjacent lane, and then, perform lane change to an original lane again, a branching event in which the host vehicle M is caused to branch to a lane on the destination side at a branch point of a road, and a merging event in which the host vehicle M is caused to merge with a main lane at a merging point. The "following" may be, for example, a traveling aspect in which an inter-vehicle distance (a relative distance) between the host vehicle M and the preceding vehicle is kept constant, or a traveling aspect in which the host vehicle M is caused to travel at a center of the host lane, in addition to the inter-vehicle distance between the host vehicle M and the preceding vehicle being kept constant. Examples of the event may include a takeover event for ending automated driving through driving control and performing switching to manual driving, and an avoidance event in which the host vehicle M is caused to perform at least one of braking and steering in order to avoid an obstacle present in front of the host vehicle M.

The event determiner 142, for example, may change an event already determined for the current section to another event or determine a new event for the current section according to the situation of the surroundings recognized by the recognizer 130 when the host vehicle M is traveling.

The event determiner 142 may change the event already determined for the current section to another event or determine a new event for the current section according to an operation of the occupant with respect to an in-vehicle device. For example, when the blinker switch 34 has been operated by the occupant, the event determiner 142 may change the event already determined for the current section to a lane change event or determine a new lane change event for the current section.

The target trajectory generator 144 generates a future target trajectory in which the host vehicle M is caused to travel automatically (without depending on a driver's operation) in a traveling aspect defined according to the event in order to cope with the situation of the surroundings when the host vehicle M travels in the recommended lane determined by the recommended lane determiner 61 in principle and the host vehicle M travels in the recommended lane. The target trajectory includes, for example, a position element that defines a future position of the host vehicle M, and a speed element that defines a future speed of the host vehicle M.

For example, the target trajectory generator 144 determines a plurality of points (trajectory points) that the host vehicle M is to reach in order as the position element of the target trajectory. The trajectory point is a point that the host vehicle M is to reach for each predetermined traveling distance (for example, several [m]). The predetermined traveling distance may be calculated, for example, using a road distance when the host vehicle M travels along the route.

The target trajectory generator 144 determines a target speed and a target acceleration at every predetermined sampling time (for example, several tenths of a [sec]) as the speed element of the target trajectory. The trajectory point may be a position that the host vehicle M is to reach at the sampling time at every predetermined sampling time. In this case, the target speed or the target acceleration is determined by the sampling time and an interval between the trajectory points. The target trajectory generator 144 outputs information indicating the generated target trajectory to the second controller 160.

The second controller 160 controls the travel driving force output device 200, the brake device 210, and the steering device 220 so that the host vehicle M passes through the target trajectory generated by the action plan generator 140 at a scheduled time.

The second controller 160 includes, for example, a first acquirer 162, a speed controller 164, and a steering controller 166. The first acquirer 162 acquires information on the target trajectory (trajectory points) from the target trajectory generator 144, and stores the information in the memory of the storage 180.

The speed controller 164 controls one or both of the travel driving force output device 200 and the brake device 210 on the basis of a speed element (for example, target speed or target acceleration) included in the target trajectory stored in the memory.

The steering controller 166 controls the steering device 220 according to a position element (for example, a curvature indicating a degree of curvature of the target trajectory) included in the target trajectory stored in the memory. The driving control in the embodiment is, for example, to control one or both of the travel driving force output device 200/the brake device 210 and the steering device 220.

Processes of the speed controller 164 and the steering controller 166 are realized by, for example, a combination of feedforward control and feedback control. For example, the steering controller 166 executes a combination of feedforward control according to a curvature of a road in front of the host vehicle M and feedback control based on a deviation from the target trajectory.

The travel driving force output device 200 outputs a travel driving force (torque) for traveling of the vehicle to the driving wheels. The travel driving force output device 200 includes, for example, a combination of an internal combustion engine, an electric motor, a transmission, and the like and a power electronic control unit (ECU) that controls these. The power ECU controls the above configuration according to information input from the second controller 160 or information input from the driving operator 80.

The brake device 210 includes, for example, a brake caliper, a cylinder that transfers hydraulic pressure to the brake caliper, an electric motor that generates hydraulic pressure in the cylinder, and a brake ECU. The brake ECU controls the electric motor according to information input from the second controller 160 or information input from the driving operator 80 so that a brake torque according to a braking operation is output to each wheel. The brake device 210 may include a mechanism that transfers the hydraulic pressure generated by the operation of the brake pedal included in the driving operator 80 to the cylinder via a master cylinder as a backup. The brake device 210 is not limited to the configuration described above and may be an electronically controlled hydraulic brake device that controls the actuator according to information input from the second controller 160 and transfers the hydraulic pressure of the master cylinder to the cylinder.

The steering device 220 includes, for example, a steering ECU and an electric motor. The electric motor, for example, changes a direction of the steerable wheels by causing a force to act on a rack and pinion mechanism. The steering ECU drives the electric motor according to information input from the second controller 160 or information input from the driving operator 80 to change the direction of the steerable wheels.

The third controller 170 includes, for example, a second acquirer 172 and an HMI controller 174. The HMI controller 174 is an example of a "display controller".

The second acquirer 172 acquires information on the recognition result of the recognizer 130. The second acquirer 172 acquires information on the target trajectory generated by the target trajectory generator 144. The second acquirer 172 acquires map information of surroundings of the host vehicle M and map information to a destination from the navigation device 50 or the MPU 60. The second acquirer 172 acquires information on the recommended lane determined by the recommended lane determiner 61.

The HMI controller 174 causes the HMI 30 to output various types of information on the basis of the information acquired by the second acquirer 172. For example, the HMI controller 174 generates an image corresponding to the information acquired by the second acquirer 172, and causes the generated image to be displayed on the display 32. For example, the HMI controller 174 causes the generated image to be displayed on one or both of the first display 32A and the second display 32B designated by the occupant. The HMI controller 174 may cause the display associated with the traveling aspect of the host vehicle M (for example, an event in driving control) to display the generated image.

The HMI controller 174 may determine whether or not predetermined control is to be executed by the second controller 160 on the basis of the information acquired by the second acquirer 172, and change the display aspect of the generated image when the predetermined driving control is to be executed. The predetermined driving control is, for example, driving control for causing the host vehicle M to return to the original lane after causing the host vehicle M to perform lane change. The predetermined driving control includes driving control according to the overtaking event. The display aspect includes a display position or display content.

[Process of HMI Controller in Each Scene]

Hereinafter, a process of the HMI controller 174 in each scene in which the host vehicle M travels through driving control will be described. In the following description, it is assumed that times t1 to t5 and ta to tc satisfy relationships of "t1<t2<t3<t4<t5" and "t1<ta<tb<tc". In the following description, it is assumed that an image that is generated by the HMI controller 174 is displayed on the first display 32A.

A tachometer indicating the rotational speed of an engine, a speedometer indicating the speed of the host vehicle M, or the like may also be included in the image displayed on the first display 32A, but description thereof will be omitted below.

<First Scene (Time t1)>

Figure 4:
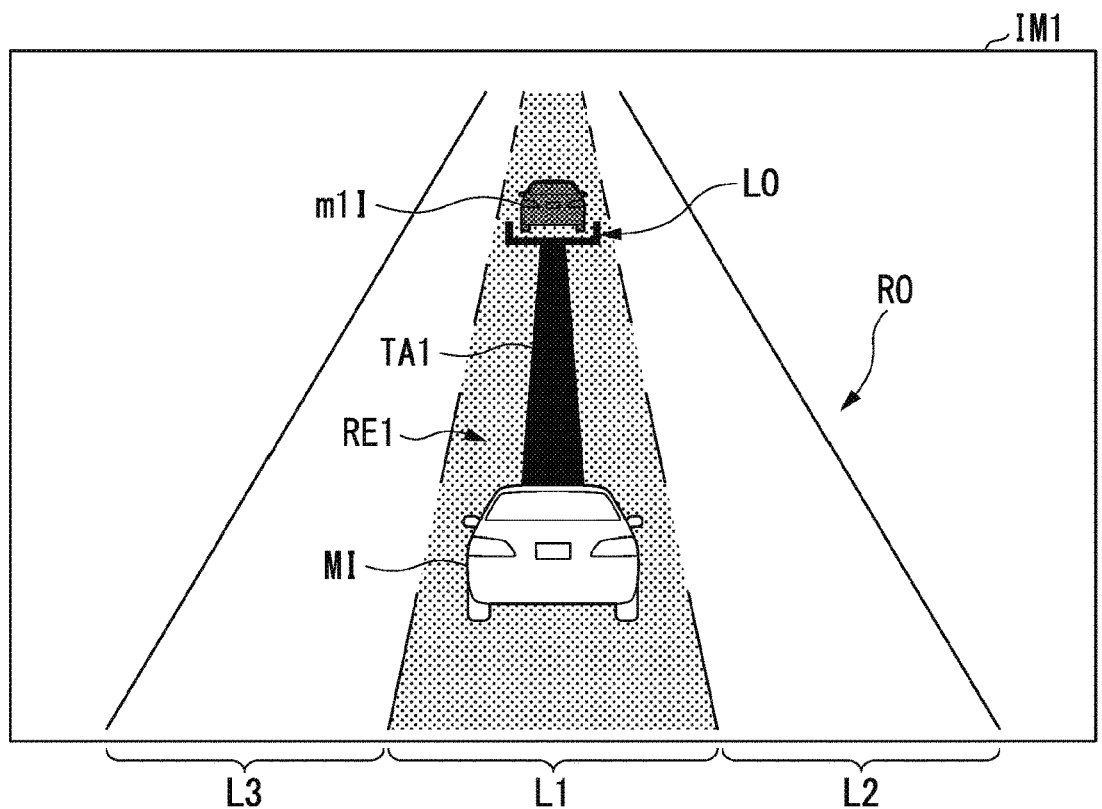
FIG. 4 is a diagram showing an example of an image that is generated by an HMI controller in a first scene.

A first scene (time t1) is a scene in which the driving control device 100 is executing a following traveling event. FIG. 4 is a diagram showing an example of an image IM1 that is generated by the HMI controller 174 in the first scene. In the first scene, it is assumed that the host vehicle M is traveling in a lane L1 among three lanes L1 to L3 and follows the other vehicle m1 which is a preceding vehicle traveling in front of the host vehicle M. In the first scene, a recommended lane is the lane L1. It is assumed that the image IM1 is an image corresponding to an image display area in the first display 32A. The same applies to subsequent images IM2 to IM8.

In this scene, the HMI controller 174 generates, for example, a road image (an example of a first image) RO simulating a road around the host vehicle M recognized by the recognizer 130. The road image RO includes, for example, images simulating the lanes L1 to L3. In the example of FIG. 4, the road image RO in which the lane L1 in which the host vehicle M is traveling is positioned near a center (for example, a center in the width direction) of the image IM1 is shown. The HMI controller 174 may cause a marking line between lanes in which the host vehicle M can perform lane change and a marking line between lanes in which the host vehicle M cannot perform lane change to be displayed in different display aspects (for example, a solid line and a dotted line). Whether or not the host vehicle M can perform lane change can be determined, for example, by referring to map information (the first map information 54 and the second map information 62). In the example of FIG. 4, in the image IM1, areas between two of the lanes L1 to L3 are indicated by marking lines (dotted lines) in which the host vehicle M can perform lane change.

The HMI controller 174 may generate an image simulating the host vehicle M (hereinafter referred to as a host vehicle image MI) and an image simulating the other vehicle m1 recognized by the recognizer 130 (hereinafter referred to as the other-vehicle image m1I), and cause the generated host vehicle image MI and the generated other-vehicle image m1I to be superimposed and displayed at positions on the road image RO at which the respective vehicles are present. In this case, the HMI controller 174 may make colors, patterns, shapes, and the like different so that the occupant visually recognizes the host vehicle image MI and the other-vehicle image m1I in a distinguishable manner. The HMI controller 174 may adjust a size of each of the shapes of the host vehicle image MI and the other-vehicle image m1I in association with a size of the lanes in the road image RO.

The HMI controller 174 generates a recommended lane image (an example of a second image) RE1 simulating the recommended lane acquired by the second acquirer 172. The recommended lane image RE1 includes, for example, an image in which substantially an entire lane area corresponding to the recommended lane has been colored with a predetermined color. The predetermined color, for example, may be a predetermined color or may be a color associated with the traveling aspect of the host vehicle M. The predetermined color may be a color that can be visually recognized by the occupant through adjustment of a pattern, brightness, lightness, color tone of saturation, light and darkness, and the like, or may be a color transmitted with a predetermined transmittance. The HMI controller 174 causes the recommended lane image RE1 to be displayed at a position associated with the road image RO. The position associated with the road image RO in this case is, for example, a position associated with a display position of the lane corresponding to the recommended lane among the lanes L1 to L3 included in the road image RO. In the example of FIG. 4, in the image IM1, the recommended lane image RE1 is superimposed on substantially the entire area of the lane L1 included in the road image RO.

The HMI controller 174 generates a target trajectory image (an example of a third image) TA1 simulating the target trajectory acquired by the second acquirer 172. The target trajectory image TA1 is, for example, an image with an area narrower than an area corresponding to the recommended lane. This area is colored, for example, with a color such that the occupant can visually recognize the area while distinguishing the area from other areas. The display controller 174 causes the generated target trajectory image TA1 to be displayed at a position associated with the road image RO. The position associated with the road image RO in this case is, for example, a position associated with the position of the host vehicle M on the lane L1 among the lanes L1 to L3 included in the road image RO. In the example of FIG. 4, in the image IM1, the target trajectory image TA1 is positioned at a position in which the host vehicle image MI on the road image RO is a start point and the other-vehicle image m1I is an end point. In the image IM1, the target trajectory image TA1 is superimposed on the road image RO and the recommended lane image RE1.

The HMI controller 174 may generate a lock-on image LO indicating that the other vehicle m1 is recognized as a vehicle that is a following target (a lock-on vehicle) in the driving control, and cause the generated image to be displayed at a position associated with the other-vehicle image m1I. In the example of FIG. 4, in the image IM1, a U-shaped lock-on image LO is shown behind (directly below) the other-vehicle image m1I. Accordingly, it is possible to make it easy for the occupant to visually recognize a state of the driving control of the host vehicle M from the image IM1.

<Second Scene (Time t2)>

A second scene (time t2) is a scene in which a distance between the host vehicle M and the other vehicle m1 is within a predetermined distance, and an overtaking event in which the host vehicle M overtakes the other vehicle m1 is executed at time t2 after a predetermined time has elapsed from time t1. Time t2 is a time at which the traveling aspect of the host vehicle is switched from following traveling to overtaking traveling. In the following description, it is assumed that driving control for causing the host vehicle M to perform lane change from the lane L1 to the lane L2, causing the host vehicle M to overtake the other vehicle m1 through acceleration control, and then, causing the host vehicle M to return to the original lane L1 is executed as the overtaking event. In this case, the target trajectory generator 144 generates a target trajectory for executing the above driving control as an overtaking event.

Figure 5:
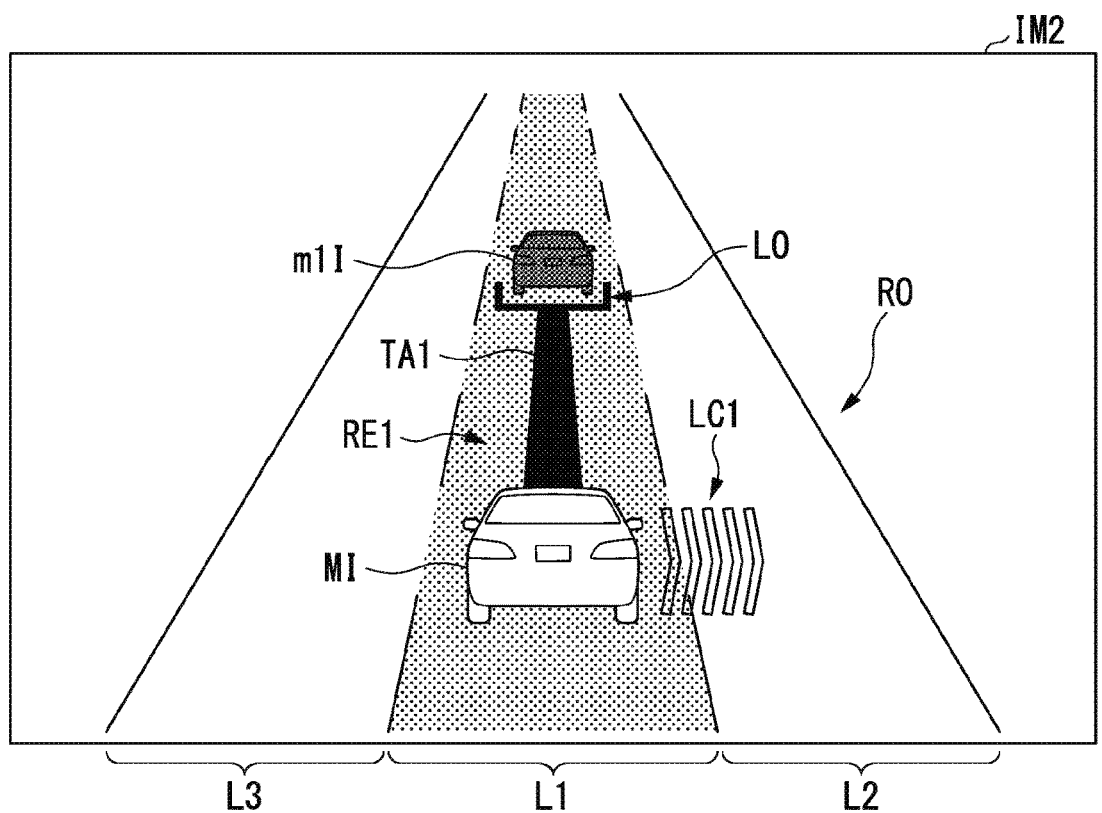
FIG. 5 is a diagram showing an example of an image that is generated by the HMI controller in a second scene.

FIG. 5 is a diagram showing an example of an image IM2 that is generated by the HMI controller 174 in the second scene. Hereinafter, portions different from those in the image IM1 will be described. It is assumed that for each of subsequent images, portions different from those in an image displayed immediately before will be described. In the second scene, the HMI controller 174 generates a lane change image (an example of a fourth image) LC indicating that the host vehicle M will perform lane change through driving control. The lane change image LC is, for example, an image that is formed by a figure, an arrow, or the like in which a lane that is a lane change destination of the host vehicle M can be visually recognized. The HMI controller 174 may generate the lane change image LC as an image noticing lane change prior to start of movement (lateral movement or movement in a width direction) of the host vehicle M to the lane that is a lane change destination. In this case, the HMI controller 174 makes the display aspect of the lane change image LC different, for example, between before and after the start of the movement of the host vehicle M to the lane that is a lane change destination. Specifically, the HMI controller 174 may generate the lane change image LC1 of only an outer frame (a contour; a hollow shape) of a figure indicating a direction of lane change, or the like before the start of the movement to the lane that is a lane change destination, and generate a lane change image LC2 in which the inside of the outer frame of the figure is filled with a predetermined color after the start. The HMI controller 174 may generate an animated image in which switching from the lane change image LC1 to the lane change image LC2 occurs in a stepwise manner or fluidly, including before and after the start of lane change. The HMI controller 174 may generate an image in which a blinker on the right side of the host vehicle M blinks, together with the lane change image LC1 or LC2, and cause the generated images to be superimposed on the host vehicle image MI1 and displayed. In the example of FIG. 5, the lane change image LC1 before the start of the movement to the lane that is a lane change destination is shown on the right side (on the side of the lane that is a changing destination) of the host vehicle image MI in the image IM2.

The HMI controller 174 determines whether or not the second controller 160 executes predetermined driving control on the basis of the target trajectory acquired by the second acquirer 172. In the second scene, since the target trajectory is a target trajectory in which the driving control for causing the host vehicle M to perform lane change from the lane L1 to the lane L2, to overtake the other vehicle m1 through acceleration control, and to return to the original lane L1 is executed, the HMI controller 174 determines that predetermined driving control is to be executed. When it is determined that predetermined driving control is to be executed, the HMI controller 174, for example, changes the display aspect of the target trajectory image TA1 without changing the display aspect of the recommended lane image RE1.

<Third Scene (Time t3)>

Figure 6:
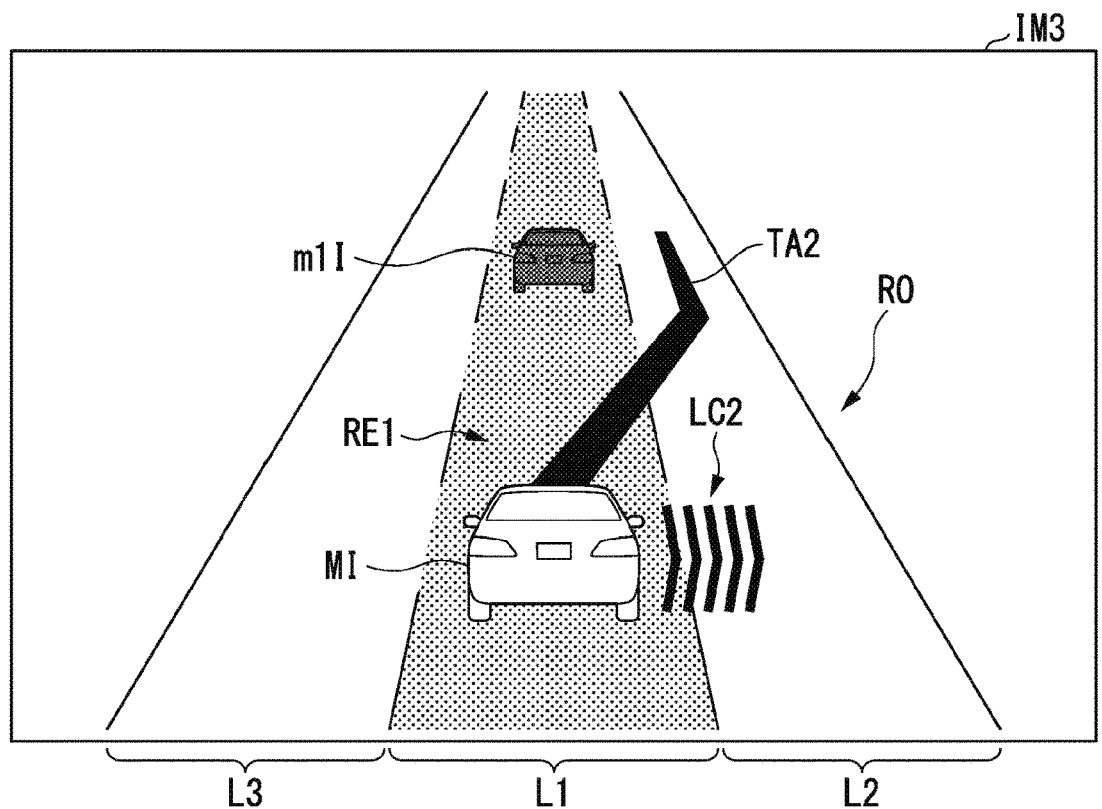
FIG. 6 is a diagram showing an example of an image that is generated by the HMI controller in a third scene.

A third scene (time t3) is a scene in which movement of the host vehicle M is started according to lane change in the overtaking event. FIG. 6 is a diagram showing an example of an image IM3 that is generated by the HMI controller 174 in the third scene. In the third scene, the HMI controller 174 maintains a state in which the recommended lane image RE1 generated in the first scene is displayed on the lane L1 without changing the display position of the recommended lane image RE1 to the lane L2 side. The HMI controller 174 generates a target trajectory image TA2 simulating a target trajectory for lane change, and causes the generated target trajectory image TA2 to be superimposed on the road image RO and displayed. In the example of FIG. 6, the recommended lane image RE1 is shown on the lane L1 in the image IM3, and the target trajectory image TA2 is at a position (in a traveling direction of the host vehicle M) associated with the display position of the host vehicle image MI.

In the third scene, the HMI controller 174 generates a lane change image LC2 in which the inside of an outer frame of a figure indicating a direction of the lane change is filled with a predetermined color, after movement to a lane that is a lane change destination has been started, and causes the generated lane change image LC2 to be displayed at a position associated with the display position of the host vehicle image MI. In the example of FIG. 6, in the image IM3, the lane change image LC2 after the start of the movement to the lane that is a lane change destination is shown to the right of the host vehicle image MI.

<Fourth Scene (Time t4)>

Figure 7:
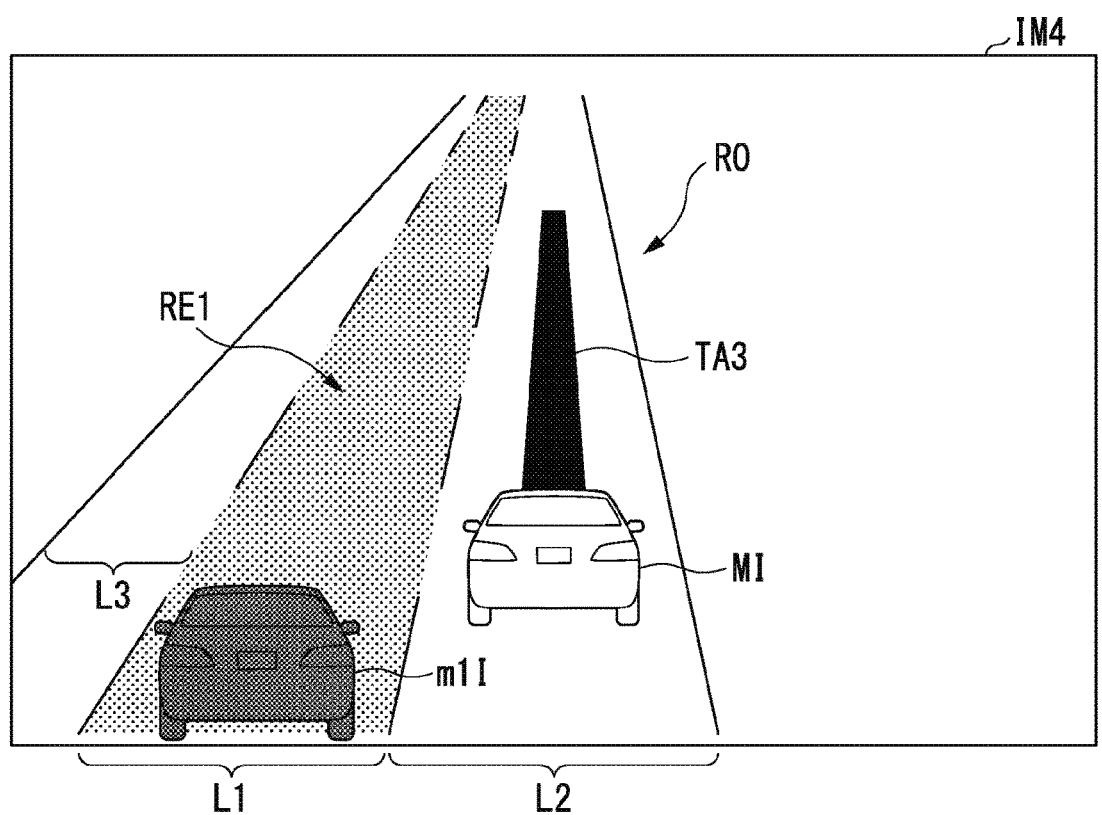
FIG. 7 is a diagram showing an example of an image that is generated by the HMI controller in a fourth scene.

A fourth scene (time t4) is a scene in which the host vehicle M is caused to travel through acceleration control after the lane change from the lane L1 to the lane L2 has been completed in the overtaking event. FIG. 7 is a diagram showing an example of an image IM4 that is generated by the HMI controller 174 in the fourth scene. In the fourth scene, the HMI controller 174 causes the lane L2 in which the host vehicle M travels in the generated road image RO to be positioned near a center of the image IM4 and displayed. The HMI controller 174 may generate only an image simulating the lane L2 which is a traveling lane and the lane L1 which is a lane adjacent thereto, and may not generate an image simulating a lane (the lane L3 in the example of FIG. 7) farther away than the lane adjacent to the lane L2. Thus, it is possible to reduce a processing load in image generation by omitting information on lanes having less influence on the host vehicle M. Since information that is less likely to be visually recognized by the occupant can be reduced, it is possible to make it easy for necessary information to be reliably visually recognized and, as a result, to perform display control that gives a higher sense of security to the occupant.

In the fourth scene, since the host vehicle M travels in a direction in which the lane L2 extends through acceleration control for the overtaking event, the HMI controller 174 generates a target trajectory image TA3 in which the lane L2 is straight and causes the generated target trajectory image TA3 to be displayed on the lane L2. In the example of FIG. 7, the target trajectory image TA3 is shown at a position in the direction in which the lane L2 extends, with reference to the display position of the host vehicle image MI in the image IM4. In the fourth scene, the display aspect in which the recommended lane image RE1 is displayed on the lane L1 is kept without the display aspect of the recommended lane image RE1 being changed.

<Fifth Scene (Time t5)>

Figure 8:
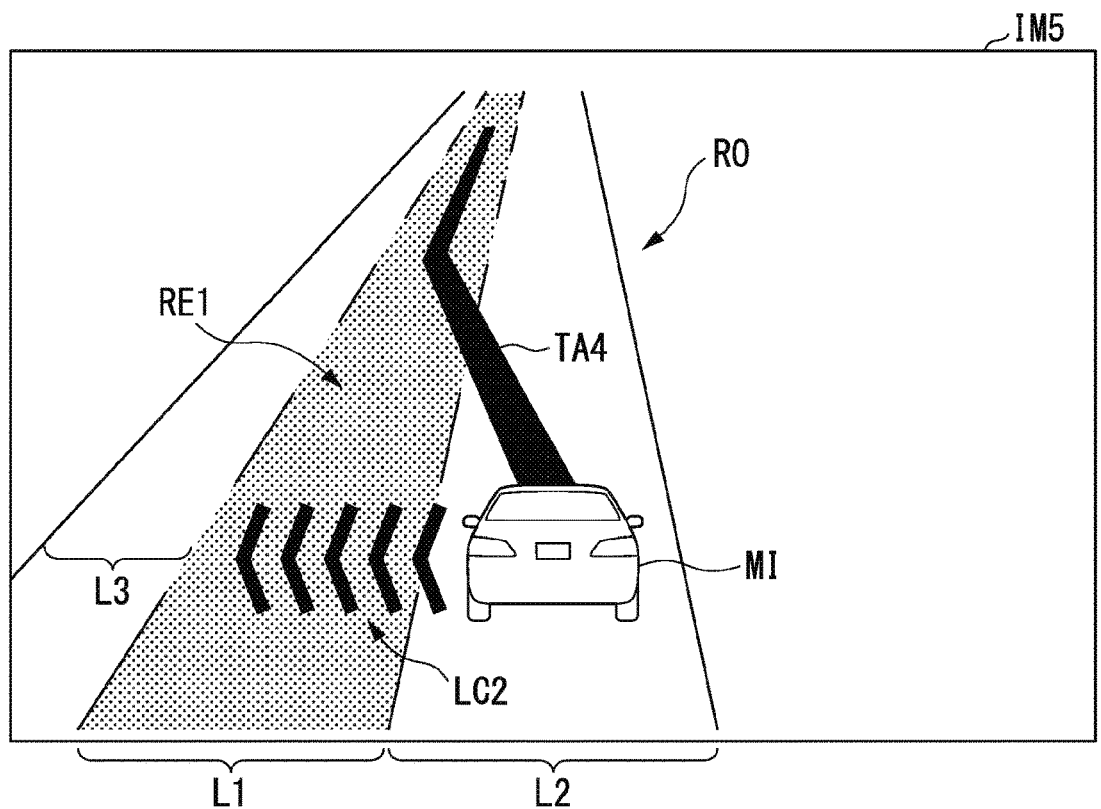
FIG. 8 is a diagram showing an example of an image that is generated by the HMI controller in a fifth scene.

A fifth scene (time t5) is a scene in which driving control for causing the host vehicle M which has overtaken the other vehicle m1 to return from the lane L2 to the lane L1 in the overtaking event is performed. FIG. 8 is a diagram showing an example of the image IM5 that is generated by the HMI controller 174 in the fifth scene. In the fifth scene, the HMI controller 174 generates a target trajectory image TA4 corresponding to a target trajectory for lane change from the lane L2 to the lane L1, and causes the generated target trajectory image TA4 to be displayed at a position associated with a display position of the road image RO. In the fifth scene, the HMI controller 174 generates a lane change image LC2 in which the inside of an outer frame of a figure indicating a direction of the lane change is filled with a predetermined color, after movement to a lane that is a lane change destination has been started, and causes the generated lane change image LC2 to be displayed at a position associated with the display position of the host vehicle image MI.

In the example of FIG. 8, in the image IM5, the target trajectory image TA4 is shown at a position (in a traveling direction of the host vehicle M) associated with the display position of the host vehicle image MI. In the image IM5, the lane change image LC2 after the start of the movement to the lane that is a lane change destination is shown to the left of the host vehicle image MI. In a state in which the image IM shown in FIG. 8 has been displayed, the driving control for causing the host vehicle M to return to the lane L1 is executed, and the driving control according to the overtaking event ends at a point in time at which the lane change to the lane L1 has been completed.

Thus, in the embodiment, it is possible to make it easy for the occupant to ascertain that the lane change of the host vehicle M is lane change that is on the premise that the host vehicle M will return to an original lane in the near future, by not changing the recommended lane image RE1 in a duration of time from the first scene to the fifth scene (time t1 to t5) described above, in other words, lane change for overtaking other vehicles or objects present ahead. Accordingly, it is possible to perform driving control that gives a higher sense of security to the occupant.

<Sixth Scene (Time ta)>

Figure 9:
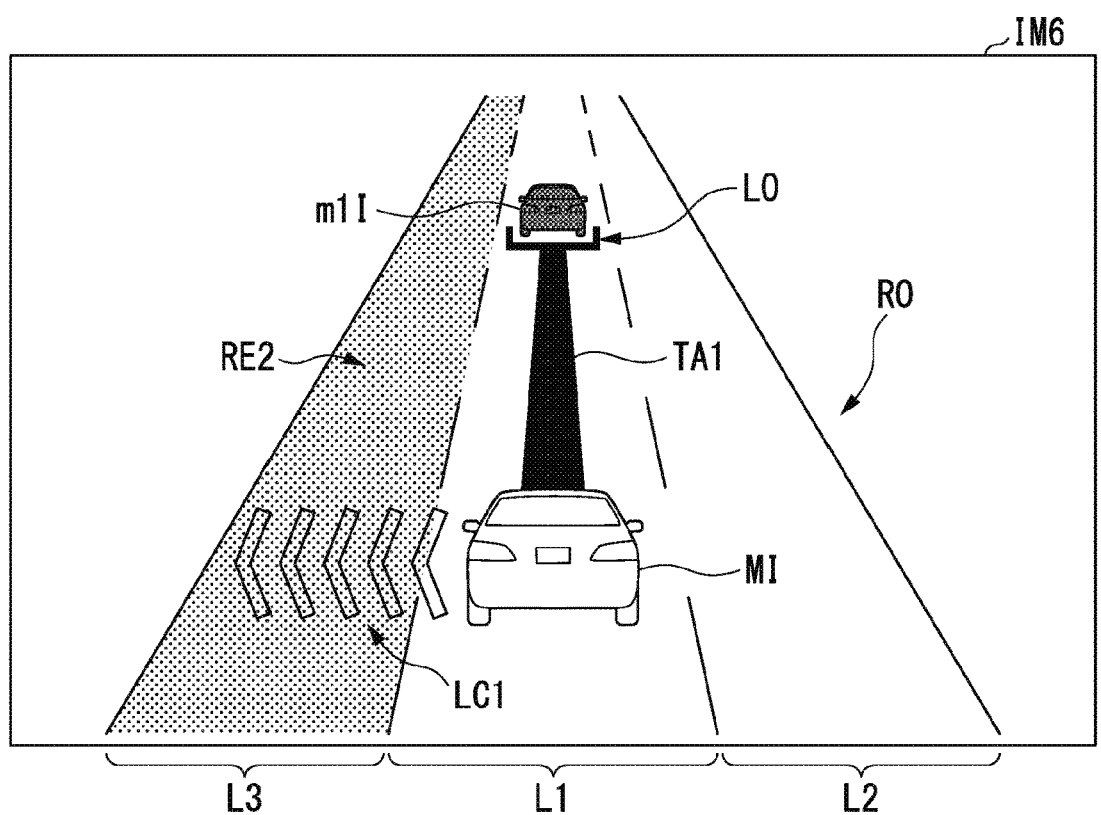
FIG. 9 is a diagram showing an example of an image that is generated by the HMI controller in a sixth scene.

A sixth scene (time ta) is a scene in which after the first scene (time t1), a lane change instruction is received from the occupant of the host vehicle M, and lane change in an instructed direction is performed through driving control using the LCA. FIG. 9 is a diagram showing an example of an image IM6 that is generated by the HMI controller 174 in the sixth scene. In the sixth scene, the HMI controller 174 determines whether or not the lane change instruction has been received from the occupant of the host vehicle M on the basis of the information acquired by the second acquirer 172. For example, when blinking of the blinker corresponding to the direction instructed by the blinker switch 34 has been started, the HMI controller 174 determines that the lane change instruction has been received from the occupant of the host vehicle M. When a target trajectory based on the LCA is executed, the HMI controller 174 may determine that the lane change instruction has been received from the occupant of the host vehicle M. Hereinafter, it is assumed that an instruction to perform lane change to the lane L3 present to the left of the host lane L1 has been received.

When it is determined that the lane change instruction has been received from the occupant of the host vehicle M, the HMI controller 174 changes the display position of the recommended lane image RE1 and generates a recommended lane image RE2 to be displayed so that the recommended lane image RE2 is superimposed on the lane L3. The HMI controller 174 generates a lane change image LC1 indicating a state before the start of the movement to the lane that is a lane change destination, together with the recommended lane image RE2.

In the example of FIG. 9, in the image IM6, the recommended lane image RE2 superimposed on the display position of the lane L3 included in the road image RO is shown, and the lane change image LC1 is shown to the left of the host vehicle image MI.

<Seventh Scene (Time tb)>

Figure 10:
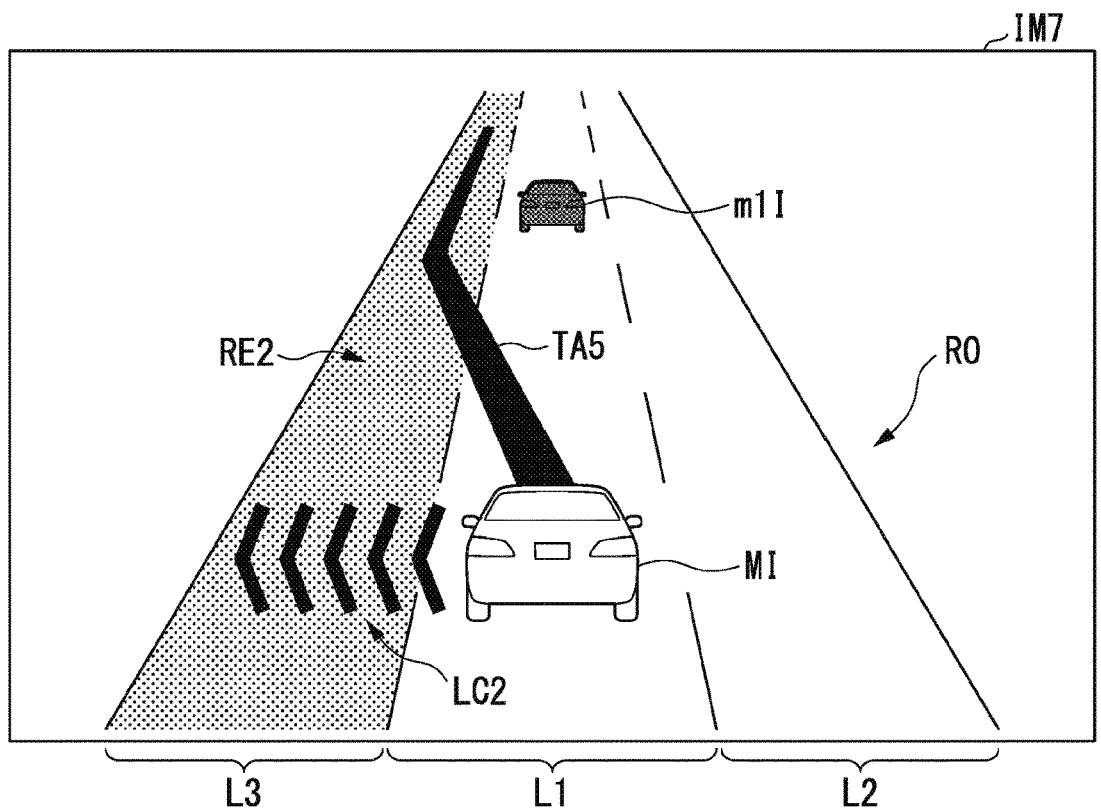
FIG. 10 is a diagram showing an example of an image that is generated by the HMI controller in a seventh scene.

A seventh scene (time tb) is a scene in which the movement of the host vehicle M according to lane change based on the LCA is started after the sixth scene. FIG. 10 is a diagram showing an example of an image IM7 that is generated by the HMI controller 174 in the seventh scene. In the seventh scene, the HMI controller 174 generates a target trajectory image TA5 simulating the target trajectory for lane change, and causes the generated target trajectory image TA5 to be superimposed on the road image RO and displayed. In the example of FIG. 10, in the image IM7, the target trajectory image TA5 is shown at a position (in a traveling direction of the host vehicle M) associated with the display position of the host vehicle image MI.

In the seventh scene, the HMI controller 174 generates a lane change image LC2 in which the inside of an outer frame of a figure indicating a direction of the lane change is filled with a predetermined color, after movement to a lane that is a lane change destination has been started, and causes the generated lane change image LC2 to be displayed at a position associated with the display position of the host vehicle image MI. In the example of FIG. 10, in the image IM7, the lane change image LC2 after the start of the movement to the lane that is a lane change destination is shown to the left of the host vehicle image MI.

<Eighth Scene (Time tc)>

Figure 11:
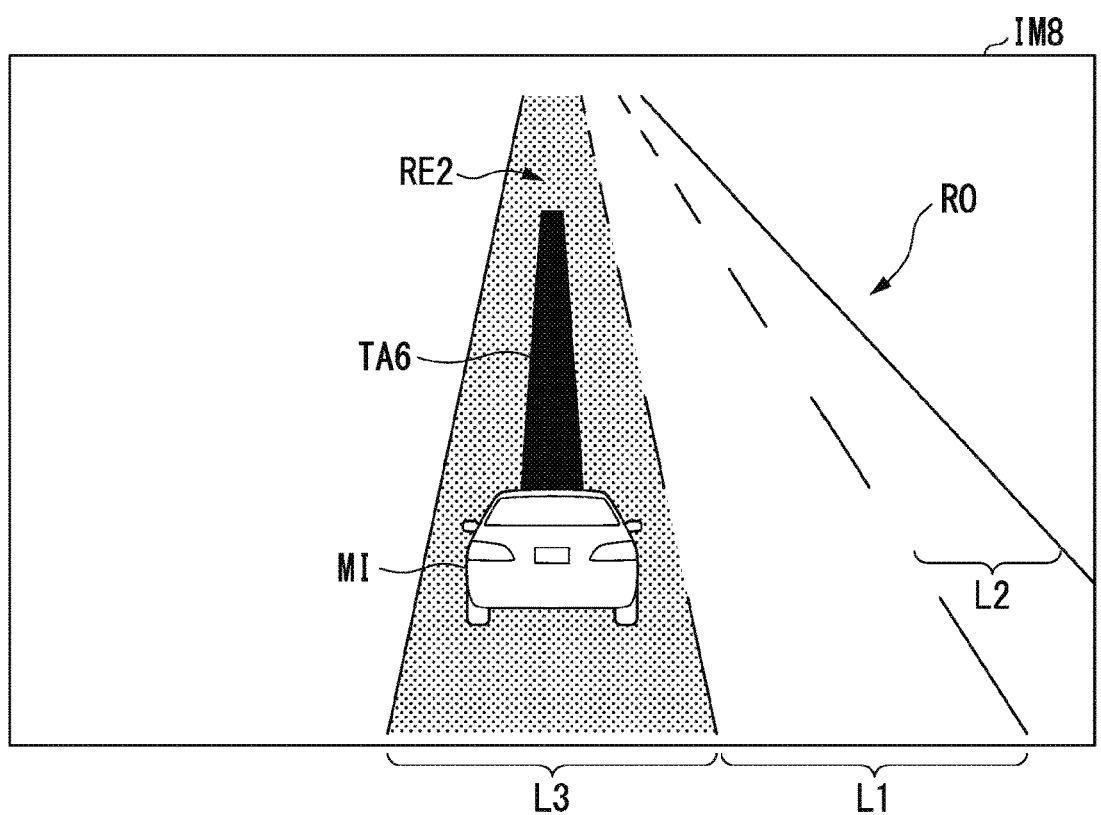
FIG. 11 is a diagram showing an example of an image that is generated by the HMI controller in an eighth scene.

An eighth scene (time tc) is a scene in which the lane change from the lane L1 to the lane L3 on the basis of the LCA has been completed. FIG. 11 is a diagram showing an example of an image IM8 that is generated by the HMI controller 174 in the eighth scene. In the eighth scene, the HMI controller 174 causes the lane L3 in which the host vehicle M travels in the generated road image RO to be positioned near a center of the image IM8 and displayed. The HMI controller 174 may generate only an image simulating the lane L3 which is a traveling lane and the lane L1 which is a lane adjacent thereto, and may not generate an image simulating a lane (the lane L2 in the example of FIG. 11) farther away than the adjacent lane of the lane L3.

In the eighth scene, since the host vehicle M travels in a direction in which the lane L3 extends, the HMI controller 174 generates a target trajectory image TA6 in which the lane L3 is straight, and causes the generated target trajectory image TA6 to be positioned at a display position of the lane L3 and displayed. In the example of FIG. 11, in the image IM8, the target trajectory image TA6 is shown at a position in the direction in which the lane L3 extends, with reference to the display position of the host vehicle image MI.

Thus, in the embodiment, by changing the display aspect of the recommended lane image in association with the driving control of the lane change according to an operation instruction from the occupant in the first situation and in a duration of time from the sixth to eighth scenes (times t1, and ta to tc) described above, it is possible to make it easy for the occupant to recognize that the driving control of the host vehicle M is being executed on the basis of the instruction of the occupant.

In the embodiment, some or all of the processes described in the first to eighth scenes described above may be included in process content in other scenes. For example, the HMI controller 174 may determine whether or not the lane change instruction is received from the occupant during execution of the overtaking event, and change the display aspect of the recommended lane image on the basis of content of the instruction when the lane change instruction is received.

<Process Flow>

Figure 12:
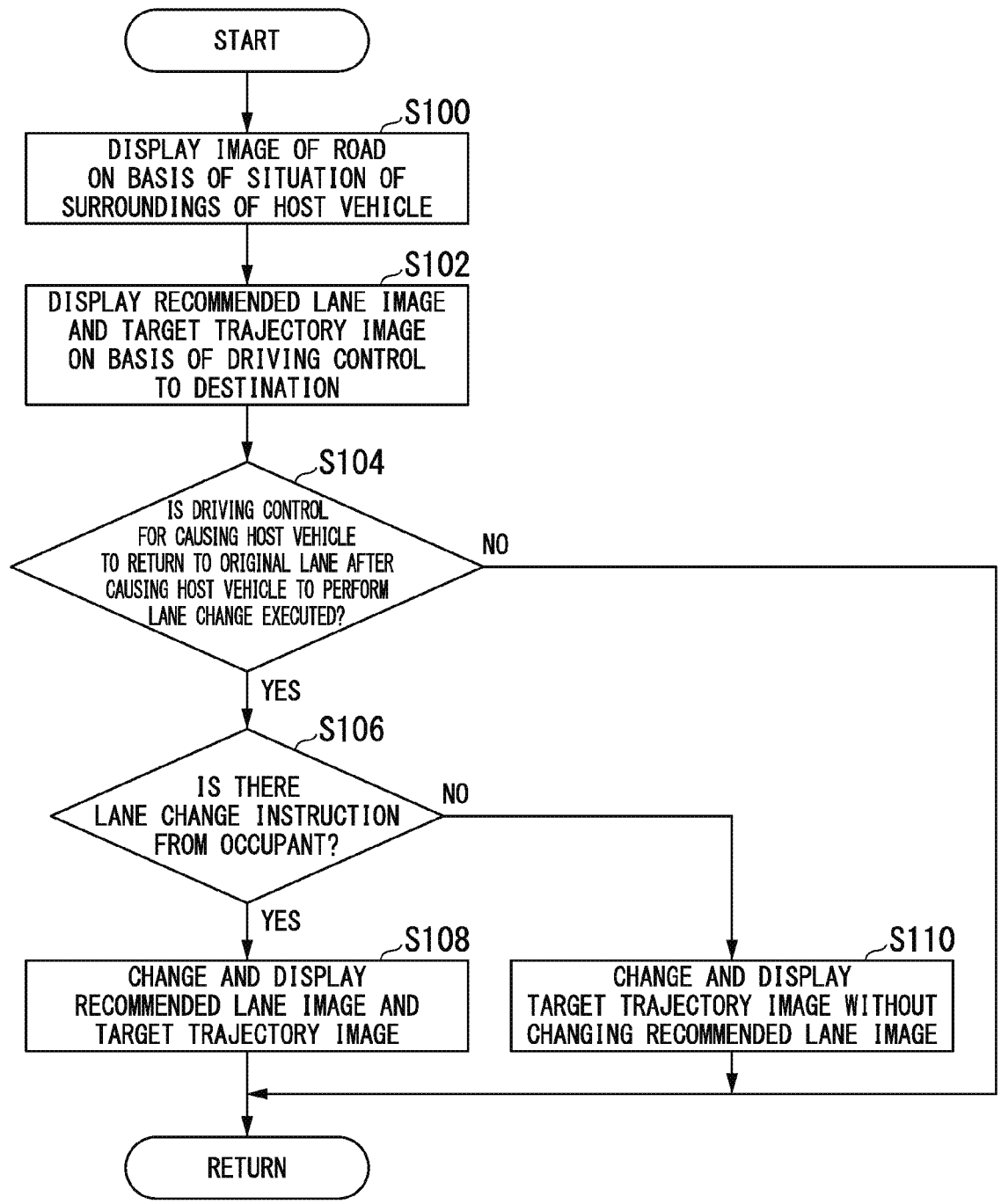
FIG. 12 is a flowchart showing an example of a flow of a series of processes in the display system.

Hereinafter, a flow of a series of processes in the display system of the embodiment will be described using a flowchart. FIG. 12 is a flowchart showing an example of the flow of a series of processes in the display system. The process of the present flowchart, for example, may be repeatedly executed at a predetermined cycle in driving control for the host vehicle M to the destination set by the navigation device 50.

First, the HMI controller 174 generates an image of a road around the host vehicle M on the basis of the situation of surroundings of the host vehicle M recognized by the recognizer 130 or the like, and causes the generated image to be displayed on the display 32 (step S100). Then, the HMI controller 174 generates the recommended lane image and the target trajectory image on the basis of driving control to the destination, and causes the generated recommended lane image and the generated target trajectory image to be displayed at a position associated with the display position of the road image (step S102).

Then, the HMI controller 174 determines whether or not driving control for causing lane change of the host vehicle M to be performed through driving control on the basis of the information acquired by the second acquirer 172 and then causing the host vehicle M to return to an original lane is to be executed (step S104). When the HMI controller 174 has determined that driving control for causing lane change to be performed and then causing the host vehicle M to return to the original lane is to be executed, the HMI controller 174 determines whether or not there has been a lane change instruction from the occupant on the basis of the information acquired by the second acquirer 172 (step S106). When the HMI controller 174 has determined that there has been the lane change instruction from the occupant, the HMI controller 174 changes the recommended lane image and the target trajectory image in association with content of the driving control, and causes the resultant images to be displayed at positions associated with the display position of the recommended lane image (step S108). When the HMI controller 174 has determined that there has been no lane change instruction from the occupant in the process of step S106, the HMI controller 174 changes the target trajectory image without changing the recommended lane image and causes the resultant image to be displayed (step S110). Accordingly, the process of this flowchart ends. When the HMI controller 174 has determined that driving control for causing lane change to be performed and then causing the host vehicle M to return to the original lane is not to be executed in the process of step S104, the process of the flowchart ends.

According to the embodiment described above, it is possible to perform the display control that gives a higher sense of security to the occupant. More specifically, according to the embodiment, for example, when the target trajectory image or the recommended lane image generated by the driving control device 100 is displayed in the drive control for causing the host vehicle M to go to the destination, the display aspect of the recommended lane image or the like is made different between lane change for causing the host vehicle M to go to the destination and lane change for causing the host vehicle M to overtake an object such as a preceding vehicle. According to the embodiment, the display aspect of the recommended lane image is made different between the control of the lane change that is performed after the driver indicates the intention of the lane change through a blinker switch operation or the like and the control of the lane change in automatic overtaking control that is executed regardless of the driver's intention. Accordingly, it is possible to cause the occupant to more clearly ascertain the purpose of lane change of the host vehicle M and a state of the driving control, and to perform the display control that gives a higher sense of security to the occupant.

[Hardware Configuration]

Figure 13:
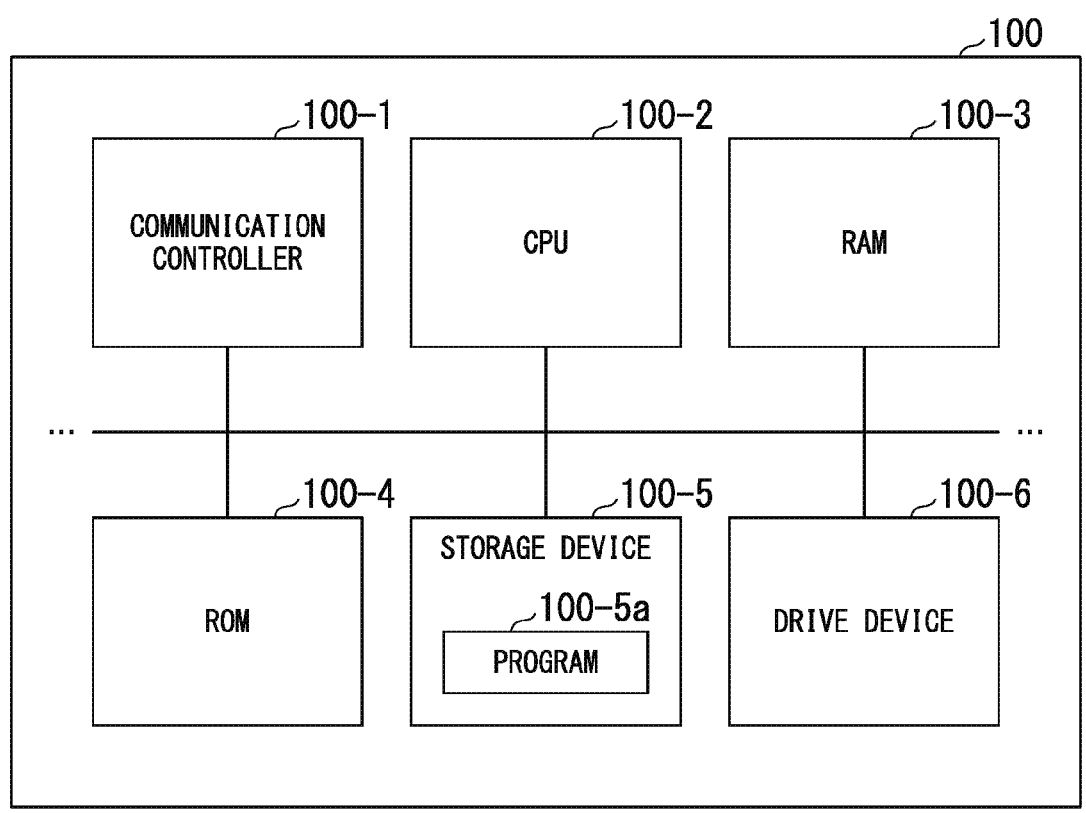
FIG. 13 is a diagram showing an example of a hardware configuration of a driving control device of the embodiment.

FIG. 13 is a diagram illustrating an example of a hardware configuration of the driving control device 100 according to the embodiment. As illustrated in FIG. 13, the driving control device 100 has a configuration in which a communication controller 100-1, a CPU 100-2, a RAM 100-3 that is used as a work memory, a ROM 100-4 that stores a boot program or the like, a storage device 100-5 such as a flash memory or an HDD, a drive device 100-6, and the like are connected to each other by an internal bus or a dedicated communication line. The communication controller 100-1 communicates with components other than the driving control device 100. A program 100-5a to be executed by the CPU 100-2 is stored in the storage device 100-5. This program is developed in the RAM 100-3 by a direct memory access (DMA) controller (not illustrated) or the like and executed by the CPU 100-2. Accordingly, some or all of the first controller 120, the second controller 160, and the third controller 170 of the driving control device 100 are realized.

The embodiment described above can be represented as follows.

A display system including
a display configured to display an image;
a storage configured to store a program; and
a processor,
wherein the processor executes the program to cause
the display to display a first image simulating a road in which the host vehicle travels,
the display to display a second image simulating a recommended lane given to a controller that performs driving control of the host vehicle at a position associated with the first image, and display a third image simulating a target trajectory generated by the controller that performs the driving control of the host vehicle at a position associated with the first image, and
the display controller to change the third image to an image simulating the target trajectory for lane change without changing a display position of the second image when the controller executes driving control for causing the host vehicle to return to an original lane after causing the host vehicle to perform lane change.

Although a mode for carrying out the present invention has been described above using the embodiment, the present invention is not limited to the embodiment at all, and various modifications and substitutions may be made without departing from the spirit of the present invention.

What is claimed is:

1. A display system comprising:
   a display configured to display a first image simulating a road on which a host vehicle is traveling; and
   a display controller configured to cause the display to display a second image simulating a recommended lane given to a controller that performs driving control of the host vehicle at a position associated with the first image, and to display a third image simulating a target trajectory generated by the controller that performs driving control of the host vehicle at a position associated with the first image,
   wherein the second image is colored so that substantially an entire area of the recommended lane is displayed on the display in a predetermined color that is different from the lane that does not correspond to the recommended lane, and superimposed on the first image,
   wherein the display controller is configured to change the third image to an image simulating the target trajectory for lane change without changing a display position of the second image displayed at a location corresponding to the lane traveled by the host vehicle in the first image, when the controller executes driving control for causing the host vehicle to return to an original lane after causing the host vehicle to perform lane change;
   wherein the display controller is configured to change the display position of the second image to a position of a lane that is a lane change destination, and cause a fourth image noticing lane change to be displayed when the controller receives an instruction for lane change from an occupant of the host vehicle and executes the lane change of the host vehicle.

2. The display system according to claim 1, wherein the third image is an image of an area narrower than the area corresponding to the recommended lane.

3. The display system according to claim 1, wherein the display controller is configured to change the third image to an image simulating the target trajectory for lane change without changing a display position of the second image when the controller executes driving control for causing the host vehicle to execute lane change for overtaking the preceding vehicle and to return to an original lane after overtaking the preceding vehicle.

4. A display method comprising:
  displaying, by a computer mounted in a host vehicle including a display that displays an image, a first image simulating a road on which the host vehicle travels;
  causing, by the computer, the display to display a second image simulating a recommended lane given to a controller that performs driving control of the host vehicle at a position associated with the first image, and to display a third image simulating a target trajectory generated by the controller that performs driving control of the host vehicle at a position associated with the first image;
  coloring the second image so that substantially an entire area of the recommended lane is displayed on the display in a predetermined color different from the lane that does not correspond to the recommended lane;
  superimposing and displaying the second image on said first image on the display; and
  changing, by the computer, the third image to an image simulating the target trajectory for lane change without changing a display position of the second image displayed at a location corresponding to the lane traveled by the host vehicle in the first image, when the controller executes driving control for causing the host vehicle to return to an original lane after causing the host vehicle to perform lane change; changing the display position of the second image to a position of a lane that is a lane change destination, and cause a fourth image noticing lane change to be displayed when the controller receives an instruction for lane change from an occupant of the host vehicle and executes the lane change of the host vehicle.

5. A computer-readable non-transitory storage medium storing a program, the program causing a computer mounted in a host vehicle including a display that displays an image to:
  cause the display to display a first image simulating a road on which the host vehicle travels;
  cause the display to display a second image simulating a recommended lane given to a controller that performs driving control of the host vehicle at a position associated with the first image, and to display a third image simulating a target trajectory generated by the controller that performs driving control of the host vehicle at a position associated with the first image;
color the second image so that substantially an entire area of the recommended lane is displayed on the display in a predetermined color different from the lane that does not correspond to the recommended lane,
  superimpose and display the second image on said first image on the display; and
  change the third image to an image simulating the target trajectory for lane change without changing a display position of the second image displayed at a location corresponding to the lane traveled by the host vehicle in the first image, when the controller executes driving control for causing the host vehicle to return to an original lane after causing the host vehicle to perform lane change; change the display position of the second image to a position of a lane that is a lane change destination, and cause a fourth image noticing lane change to be displayed when the controller receives an instruction for lane change from an occupant of the host vehicle and executes the lane change of the host vehicle.

* * * * *